E. W. ADAMS.
PIPE COUPLING.
APPLICATION FILED JULY 25, 1907.
912,929.
Patented Feb. 16, 1909.
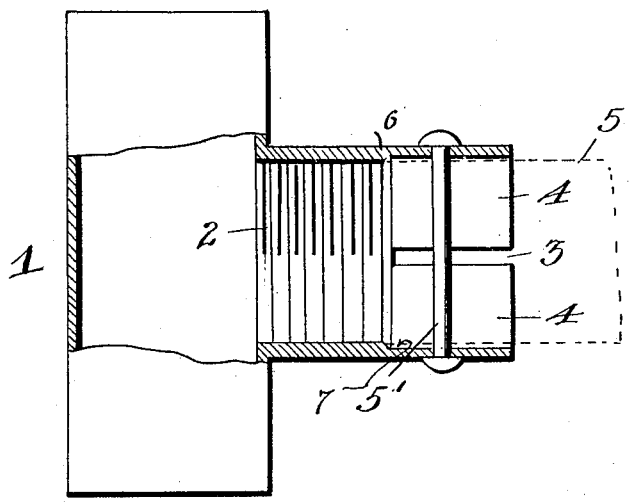

UNITED STATES PATENT OFFICE.

ELMER WILLIAM ADAMS, OF NORTH TOPEKA, KANSAS.

PIPE-COUPLING.

No. 912,929.  Specification of Letters Patent.  Patented Feb. 16, 1909.

Application filed July 25, 1907. Serial No. 385,521.

*To all whom it may concern:*

Be it known that I, ELMER WILLIAM ADAMS, a citizen of the United States, residing at North Topeka, in the county of Shawnee and State of Kansas, have invented certain new and useful Improvements in Pipe-Couplings; and I do declare the following to be a full, clear, and exact description of the invention, such as will enable others skilled in the art to which it appertains to make and use the same.

This invention has relation to new and useful improvements in pipe couplings.

It is a well-known fact that in providing a joint or coupling for metal pipes the ends are threaded exteriorly, which necessarily weakens the ends to a certain extent; and one of the main objects of this invention is to provide a pipe coupling with simple and economical means whereby the loss in strength in pipes incident to the threading operation will be more than compensated for, and a strong or durable coupling provided.

Another object of the invention is to provide means whereby all liability of the pipes working loose after having been screwed to the coupling is eliminated.

With the foregoing and other objects in view, the invention consists of certain novel features of construction, combination and arrangement of parts, as will be more fully described and particularly pointed out in the appended claim.

In the accompanying drawings, the figure is a vertical sectional view of an ordinary tee coupling provided with my improvements, with a pipe shown in position.

In the embodiment shown, a tee coupling 1 has the stem 6 thereof provided at its inner end with the usual internal screw threads 2. This tubular member or stem 6 is made of a uniform circumference throughout and the outer end thereof is cut out at its inner face to form the annular recess 7 which terminates at the beginning of the screw threaded portion 2, and is designed to provide a space between the inner wall or face of said extension and the outer face of the pipe 5 to be coupled. This recessed extension is provided with a plurality of longitudinally extending slots preferably arranged at diametrically opposite points as shown at 3, to provide resilient clamping members as 4 adapted to clamp the ends of the pipes 5 and the thickened portion is designed to engage the pipe to be coupled, said pipe and thickened portion serving as a fulcrum for the clamping fingers or members 4. A suitable coupling or fastening rod 5 is preferably passed transversely through the clamping members and through the end of the pipe therein and is riveted or otherwise secured to firmly and securely clamp said members against the end of the pipe. This rod also prevents the pipe connected from working loose after it has been placed in position.

I claim as my invention:—

In a pipe coupling, the combination of a tubular member of uniform circumference throughout having an annular recess in its inner face at one end to provide a space between the wall of said recessed end and the outer face of the pipe to be coupled, said recessed end being provided with a plurality of longitudinal slots, the thinner slotted walls of the recessed portion providing clamping members, and the thickened portion engaging the pipe to be coupled serving as a fulcrum for said clamping members, and means for clamping said slotted ends to the pipe to be connected.

In testimony whereof I have hereunto set my hand in presence of two subscribing witnesses.

ELMER WILLIAM ADAMS.

Witnesses:
W. E. SCETTER,
WM. F. TINCHER.